US011775261B2

(12) United States Patent
Alabes et al.

(10) Patent No.: US 11,775,261 B2
(45) Date of Patent: Oct. 3, 2023

(54) DYNAMIC PROCESS MODEL PALETTE

(71) Applicant: Oracle International Corporation, Redwood Shores, CA (US)

(72) Inventors: Tomas Alabes, Foster City, CA (US); Nicolas Damonte, Redwood City, CA (US); Juan Allo Ron, Foster Ctiy, CA (US); Suman Ganta, Fremont, CA (US); Javier Espeche, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 326 days.

(21) Appl. No.: 15/430,244

(22) Filed: Feb. 10, 2017

(65) Prior Publication Data

US 2018/0074663 A1    Mar. 15, 2018

Related U.S. Application Data

(60) Provisional application No. 62/395,379, filed on Sep. 16, 2016, provisional application No. 62/395,341, filed on Sep. 15, 2016.

(51) Int. Cl.
*G06F 8/34*       (2018.01)
*G06Q 10/0631*    (2023.01)

(52) U.S. Cl.
CPC ......... *G06F 8/34* (2013.01); *G06Q 10/06316* (2013.01)

(58) Field of Classification Search
CPC ... G06F 8/34; G06Q 10/06316; G06Q 10/067
See application file for complete search history.

(56) References Cited

U.S. PATENT DOCUMENTS

| | | | | |
|---|---|---|---|---|
| 6,973,638 B1* | 12/2005 | Gangopadhyay | ......... | G06F 8/34 717/104 |
| 7,117,449 B1* | 10/2006 | Levin | ..................... | G06Q 10/10 715/765 |
| 7,428,495 B2* | 9/2008 | Dhar | ...................... | G06Q 40/03 705/7.26 |
| 8,082,169 B2* | 12/2011 | Crew | ..................... | G06Q 10/06 705/7.26 |
| 9,342,220 B2* | 5/2016 | Basu | ..................... | G06Q 10/06 |
| 9,740,802 B2* | 8/2017 | Nixon | ................. | G06F 17/5009 |
| 10,380,533 B2* | 8/2019 | Byron | ................. | G06Q 10/067 |
| 2001/0044738 A1* | 11/2001 | Elkin | ............... | G06Q 10/06316 705/7.26 |

(Continued)

*Primary Examiner* — Kieu D Vu
*Assistant Examiner* — Blaine T Basom
(74) *Attorney, Agent, or Firm* — Trellis IP Law Group, PC

(57) ABSTRACT

Implementations generally relate to facilitating process building. In some implementations, a method includes receiving, at a client device, process element information, where the process element information defines process elements, wherein the process elements are nodes displayed in a process, and wherein the process☐ elements are associated with process element groups based on categories. The method further includes displaying the process elements in a palette region in a user interface of the client device. The method further includes displaying the process in a workspace region in the user interface based on process elements from the palette region that are selected by a user.

10 Claims, 8 Drawing Sheets

(56) References Cited

U.S. PATENT DOCUMENTS

| | | | |
|---|---|---|---|
| 2002/0069083 A1* | 6/2002 | Harter | G06Q 10/10 |
| | | | 705/348 |
| 2005/0021348 A1* | 1/2005 | Chan | G06Q 10/067 |
| | | | 706/45 |
| 2006/0074915 A1* | 4/2006 | Bhandarkar | G06Q 10/10 |
| 2006/0293941 A1* | 12/2006 | Ivanov | G06Q 10/10 |
| | | | 715/835 |
| 2007/0276714 A1* | 11/2007 | Beringer | G06Q 10/10 |
| | | | 705/7.12 |
| 2008/0134158 A1* | 6/2008 | Salz | G06F 8/34 |
| | | | 717/148 |
| 2010/0280865 A1* | 11/2010 | Goja | G06Q 10/06 |
| | | | 703/2 |
| 2011/0264487 A1* | 10/2011 | Koerner | G06Q 10/04 |
| | | | 705/7.38 |
| 2012/0259762 A1* | 10/2012 | Tarighat | G06F 8/34 |
| | | | 705/37 |
| 2015/0066573 A1* | 3/2015 | Damonte | G06Q 10/06316 |
| | | | 705/7.26 |
| 2015/0082271 A1* | 3/2015 | Damonte | G06F 8/10 |
| | | | 717/105 |
| 2015/0161532 A1* | 6/2015 | Byron | G06Q 10/067 |
| | | | 705/348 |
| 2016/0098651 A1* | 4/2016 | Tai | G06Q 10/067 |
| | | | 705/348 |
| 2017/0140306 A1* | 5/2017 | Prabhu | G06Q 10/067 |

* cited by examiner

DYNAMIC PROCESS MODEL PALETTE

CROSS REFERENCES TO RELATED APPLICATIONS

This application claims priority from U.S. Provisional Patent Application Ser. No. 62/395,379, entitled DYNAMIC PROCESS MODEL PALETTE, filed on Sep. 16, 2016, and U.S. Provisional Patent Application Ser. No. 62/395,341, entitled SYSTEM FOR PROCESS CLOUD SERVICE, filed on Sep. 15, 2016, which are hereby incorporated by reference as if set forth in full in this application for all purposes.

BACKGROUND

Efficient, adaptable, and insightful management systems and methods can be particularly important in enterprise applications, where accurate management and informed decision making can enhance enterprise profits. Some management systems improve corporate performance by managing and optimizing a company's processes. Such systems enable organizations to be more efficient and effective. Conventional processes are hard coded and do not have much flexibility.

SUMMARY

Implementations described herein facilitate process building. In some embodiments, a non-transitory computer-readable storage medium carries one or more sequences of program instructions thereon. When executed by one or more processors, the instructions cause the one or more processors to perform operations including receiving, at a client device, process element information, where the process element information defines process elements, where the process elements are nodes displayed in a process, and where the process elements are associated with process element groups based on categories; displaying the process elements in a palette region in a user interface of the client device; and displaying the process in a workspace region in the user interface based on process elements from the palette region that are selected by a user.

With further regard to the computer-readable storage medium, in some implementations, the instructions when executed further cause the one or more processors to perform operations including enabling the user to drag and drop the process elements from the palette region into the workspace region. In some implementations, the instructions when executed further cause the one or more processors to perform operations enabling the user to connect particular process elements in the workspace region using sequence flow process elements. In some implementations, the instructions when executed further cause the one or more processors to perform operations including enabling a user to expand one or more of the process element groups in order to show one or more of the process elements. In some implementations, the workspace region includes a plurality of domain regions, where the process includes a plurality of sub-processes, and where each domain region is associated with a different sub-process. In some implementations, one or more of the process elements are associated with an event process element group. In some implementations, one or more of the process elements are associated with a gateway process element group.

In some implementations, a method includes receiving, at a client device, process element information, where the process element information defines process elements, where the process elements are nodes displayed in a process, and where the process elements are associated with process element groups based on categories; displaying the process elements in a palette region in a user interface of the client device; and displaying the process in a workspace region in the user interface based on process elements from the palette region that are selected by a user.

With further regard to the method, in some implementations, the method further includes enabling the user to drag and drop the process elements from the palette region into the workspace region. In some implementations, the method further includes enabling the user to connect particular process elements in the workspace region using sequence flow process elements. In some implementations, the method further includes enabling a user to expand one or more of the process element groups in order to show one or more of the process elements. In some implementations, the workspace region includes a plurality of domain regions, where the process includes a plurality of sub-processes, and where each domain region is associated with a different sub-process. In some implementations, one or more of the process elements are associated with an event process element group. In some implementations, one or more of the process elements are associated with a gateway process element group.

In some implementations, an apparatus includes one or more processors, and includes logic encoded in one or more non-transitory computer-readable storage media for execution by the one or more processors. When executed, the logic is operable to perform operations including receiving, at a client device, process element information, where the process element information defines process elements, where the process elements are nodes displayed in a process, and where the process elements are associated with process element groups based on categories; displaying the process elements in a palette region in a user interface of the client device; and displaying the process in a workspace region in the user interface based on process elements from the palette region that are selected by a user.

With further regard to the apparatus, in some implementations, the logic when executed is further operable to perform operations including enabling the user to drag and drop the process elements from the palette region into the workspace region. In some implementations, the logic when executed is further operable to perform operations including enabling the user to connect particular process elements in the workspace region using sequence flow process elements. In some implementations, the logic when executed is further operable to perform operations including enabling a user to expand one or more of the process element groups in order to show one or more of the process elements. In some implementations, the workspace region includes a plurality of domain regions, where the process includes a plurality of sub-processes, and where each domain region is associated with a different sub-process. In some implementations, one or more of the process elements are associated with an event process element group.

A further understanding of the nature and the advantages of particular embodiments disclosed herein may be realized by reference of the remaining portions of the specification and the attached drawings.

Figure 1:
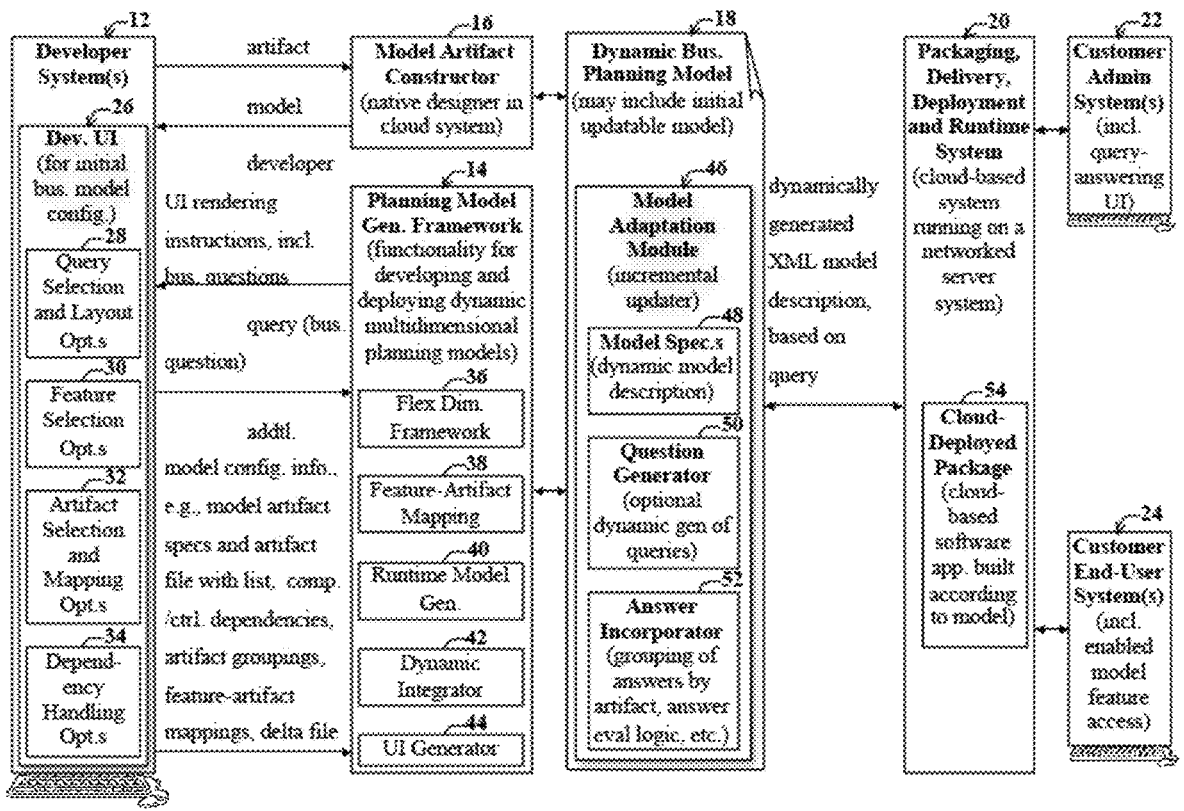
FIG. 1 illustrates an example block diagram of a system, which may be used for implementations described herein.

A further understanding of the nature and the advantages of particular embodiments disclosed herein may be realized by reference of the remaining portions of the specification and the attached drawings.

DETAILED DESCRIPTION OF EMBODIMENTS

Implementations described herein facilitate process building. Various implementations define a set of process elements that are part of a process. Implementations also provide process design functions that provide a palette of process elements. These process elements contain process model specific elements, and are also extensible to contain any other process element. This is achieved through an implementation on a client device and server service that provides a dynamic set of process elements, making a process extensible to other specifications and defined elements.

In some implementations, a method includes receiving, at a client device, process element information, where the process element information defines process elements. The method further includes displaying the process elements in a palette region in a user interface of the client device. The method further includes displaying a process in a workspace region in the user interface based on process elements selected by a user.

In various implementations, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, e.g., software. Generally, software functionality may be accessible via use of a user interface (UI), and accompanying user interface controls and features. Software functionality may include actions, such as retrieving data pertaining to an object; performing an enterprise-related task, such as promoting, hiring, and firing enterprise personnel, placing orders, calculating analytics, launching certain dialog boxes, performing searches, and so on.

In various implementations, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network, and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include human resources (HR) (e.g., enterprise personnel), financial resources, assets, employees, business contacts, sales data, and so on, of an enterprise. Examples of enterprise software include enterprise resource planning (ERP) software for facilitating managing enterprise activities (e.g., product planning, inventory management, marketing, sales, and so on). Example ERP applications include customer relationship management (CRM), human capital management (HCM), business intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a fast moving consumer goods company may plan revenue by product, market, channel, and segment, whereas an information technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain implementations discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet service providers (ISPs), identity management systems, workflow orchestrators, process schedulers, integration brokers, tenant automation systems (TASs), online analytical processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 illustrates an example block diagram of a system 100, which may be used for implementations described herein. In various implementations, system 100 is an enterprise-computing environment configured to enable initial development of a dynamic business planning model 18. In various implementations, system 100 incrementally updates business planning model 18 to meet specific enterprise needs, and uses resulting updated business planning model 18 as part of a cloud-based enterprise software application or service 54 (labeled "Cloud-Deployed Package"). While system 100 performs implementations described herein, in other implementations, any suitable component or combination of components associated with system 100 or any suitable module or module s associated with system 100 may facilitate performing the implementations described herein. In various implementations, system 100 may not have all of the components shown and/or may have other elements including other types of modules instead of, or in addition to, those shown herein.

System 100 includes a developer computer system 12 (labeled "Developer System(s)") that is in communication with a planning model generation framework 14 and a model artifact constructor 16. Computer system 12 may also be referred to herein as the developer system or the developer computer. Model artifact constructor 16 may leverage preexisting functionality, e.g., as may be available via a native designer in a cloud computing system implemented as part of system 100.

Planning model generation framework 14 and model artifact constructor 16 that are leveraged to develop business planning model 18, may further communicate with a packing, delivery, deployment and runtime system and/or computing framework 20 (labeled "Packaging, Delivery, Deployment and Runtime System"). Modules 14-20 may be hosted in a cloud, i.e., a server system accessible via a network, such as the Internet.

A cloud-deployed package 54, i.e., software application, embodying business planning model 18 is may be hosted in the cloud, i.e., cloud-based. For the purposes of the present discussion, cloud-based software may be any software run on one or more servers and accessible to client systems via a network used to communicate with the software.

In some implementations, cloud-deployed package 54 may represent a software application that may provide one or more web services for use by other software applications, and/or may provide cloud-services, e.g., on a subscription basis, to one or more client systems, e.g., a customer administrator system 22 (labeled Customer Admin System(s), and a customer end-user system 24 (labeled Customer End-User System(s). For the purposes of the present discussion, the term "customer" refers to any user, such as an administrator and/or end user, e.g., who may be part of an organization that has access to cloud-deployed package 54.

In some implementations, a developer system 12 accesses model artifact constructor 16 and planning model generation framework 14 via a network, such as the Internet. Developer system 12 may include a browser used to browse to the network address that provides access to functionality provided by model artifact constructor 16 and planning model generation framework 14.

After browsing to a network address allotted for system developers, designers, and/or other qualified personnel, various dynamic model-building functionality is accessible to the developer system, e.g., via various developer UI display screens 26 (labeled "Dev. UI").

Software functionality may be any function, capability, or feature, e.g., stored or arranged data, that is provided via computer code, e.g., software. Generally, software functionality may be accessible via use of a UI, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, where the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifact) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality. When functionality is associated with a business model artifact, the artifact may be seeded with one or more functionalities or features.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) one or more features that are available for a business planning model. The availability of a feature to an artifact may be defined in initial business planning model 18, e.g., by a developer using business planning model designer software represented by planning model generation framework 14 and model artifact constructor 16 of FIG. 1.

In some implementations, developer UI display screens 26 include a query-selection UI display screen (and/or set of UI controls) 28, a feature-selection UI display screen 30, an artifact-selection UI display screen 32 (labeled "Artifact Selection and Mapping Opts," and an artifact and feature dependency handling UI display screen 34.

Planning model generation framework 14 includes a flex-dimension framework 36, a feature-artifact mapping module 38, a runtime model generator 40, a dynamic functionality integrator 42, and a UI generator 44.

Generated, dynamic, business planning model 18, which may be defined by and/or specified via an extensible markup language (XML) document, includes a specification 48 (labeled "Model Specs") of business planning model 18, and optionally, embedded question generator code (or a link to code) 50 and answer incorporator 52, e.g., for facilitating incorporating answers to business questions, as may be provided via the customer administrator system 22 (labeled "System(s)," as discussed more fully below.

Packaging, delivery, deployment, and runtime system 20 hosts and runs deployed cloud-based software package or application 54, also referred to as "cloud-deployed package" 54. Functionality of deployed application 54, also referred to as "cloud-deployed package 54," is accessible to customer end-user client system 24.

Note that in general, groupings of various modules of system 100 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, a question generator 50 and answer incorporator 52 shown as part of dynamic business planning model 18 may instead, or in addition, be incorporated into planning model generation framework 14.

Furthermore, certain modules of planning model generation framework 14 may be implemented client-side, e.g., on developer system 12. In general, certain server-side, i.e., cloud-based modules (e.g., running on a server or server system) may be implemented client-side (e.g., running on a client computer communicating with a server), and vice versa, in a manner different than shown in FIG. 1.

In an example scenario, a business model developer (also called designer herein) employs developer system 12, e.g., artifact-selection screen 32, to specify, access, and/or configure model artifacts, leveraging model artifact constructor 16. Artifact-selection screen 32 presents one or more UI controls (which may provide so-called user options, or simply options) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings.

After developing and/or configuring a set of one or more business model artifacts, e.g., by leveraging artifact-selection screen(s) 32 and associated model artifact constructor 16, the resulting artifacts may be stored locally or via the server system that hosts modules 14-20.

Next, in the present example scenario, the developer employs feature-selection screen 30 to select and/or configure a set of business model features. Feature construction and/or selection may also be facilitated via model artifact constructor 16 and/or code run as part of planning model generation framework 14, e.g., via code run on feature-artifact mapping module 38.

After initial selection and/or configuration of a set of one or more model artifacts and one or more model features, the developer may employ one or more UI controls of artifact-selection screen 32 to configure and/or specify initial mappings and/or associated mapping rules that define associations between the configured artifacts and features.

Artifact-selection and mapping screen 32 may include UI controls that leverage the functionality of feature-artifact mapping module 38 of planning model generation framework 14. Feature-artifact mapping module 38 may include additional code for implementing automatic feature-artifact mappings in accordance with groupings of business questions and/or answers to the business questions, e.g., so as to automatically update dynamic business planning model 18, as discussed more fully below.

UI generator 44 of planning model generation framework 14 includes code for generating rendering instructions to render developer-side UI display screens 26, and further includes code for generating rendering instructions for UI display screens of cloud-deployed package 54, which are exposed to customer end-user system 24.

Figure 3:
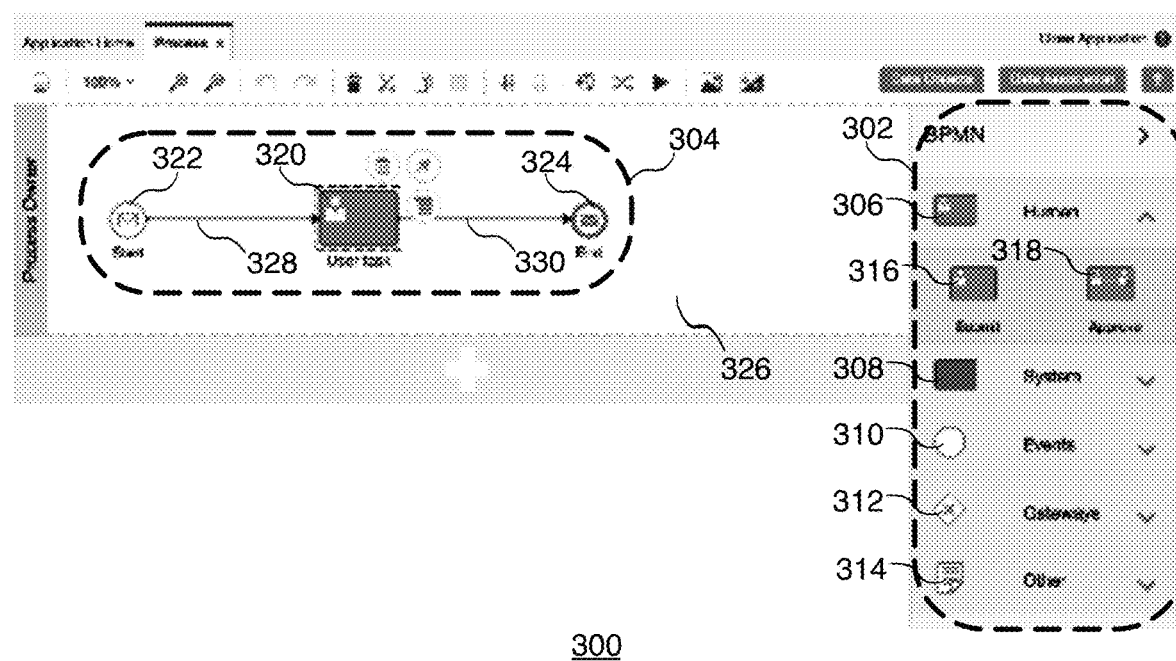
FIG. 3 illustrates an example user interface, according to some implementations.
Figure 5:
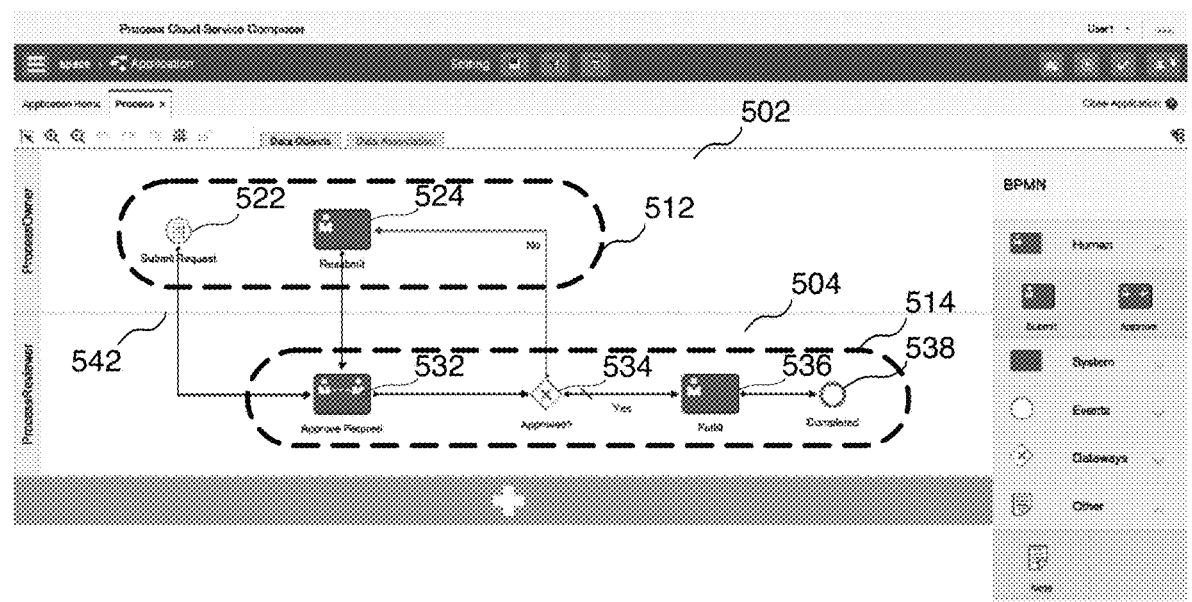
FIG. 5 illustrates an example user interface, according to some implementations.
Figure 6:
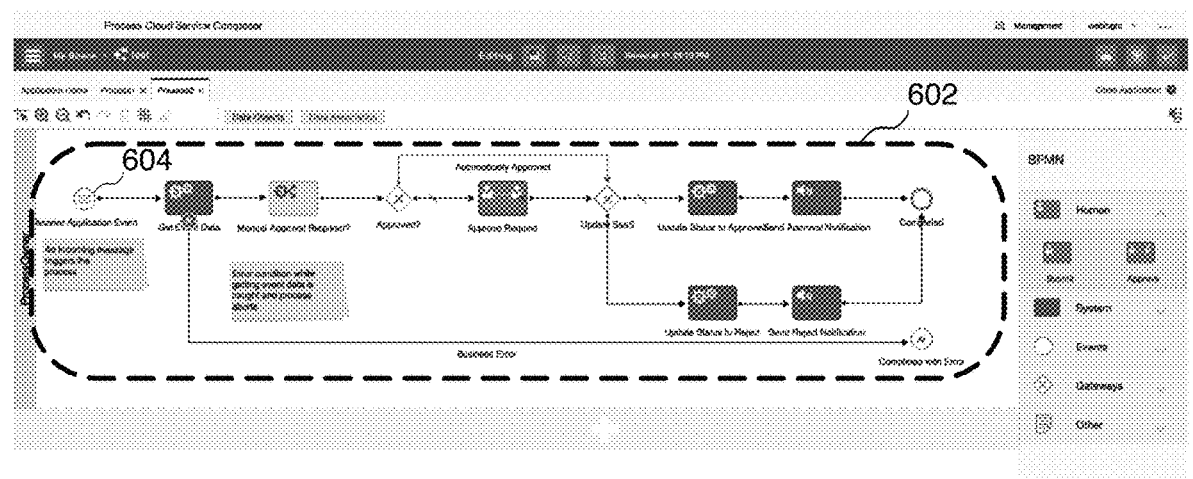
FIG. 6 illustrates an example user interface, according to some implementations.

Developer-side query-selection and layout options screen 28 includes UI controls and access to associated functionality for defining, selecting, and/or grouping business questions (called queries) to be exposed in a UI display screen accessible to customer administrator system 22. The UI display screens are displayed as part of the dynamic business planning model 18 and are exposed to the customer administrator system 22, and include a UI display screen (an example of which is shown in FIGS. 3, 5, and 6) that lists business questions that have been enabled for existing dynamic business planning model 18.

The initial business questions selected by a developer using query-selection and layout options screen 28 may be listed and/or otherwise formatted in accordance with developer-selected layout options provided via query-selection and layout options screen 28. UI controls of query-selection and layout options screen 28 provide developer-access to associated functionality (e.g., functionality which may be provided via UI generator 44 and feature-artifact mapping module 38 and/or other modules of planning model generation framework 14) for defining, selecting, and/or otherwise configuring business questions and how the questions will be laid out in a UI display screen exposed to a customer administrator, e.g., via customer administrator system 22.

Mappings of artifacts are grouped by business question or by business question group or type. Mappings of artifacts to features may depend, in part, on the business questions established via use of query-selection and layout options screen 28.

The developer may further specify dependency-handling options via one or more UI controls provided in dependency-handling options screen 34. The dependencies may include dependencies between business questions (e.g., in cases where the answer to one business question may affect other questions or answers, and dependencies between different artifacts (and/or groups or types of artifacts), and dependencies between different features (and/or groups or types of features). Such dependencies may require that a change (e.g., difference) in one question, artifact, and/or feature, be propagated to another question, artifact, and/or feature.

Various implementations discussed herein may employ difference or delta processing to ensure that dependencies are handled without introducing conflicts. This involves referencing the established associations and associated selected configuration options (e.g., as may be specified by a developer via dependency-handling options screen 34) and making adjustments to the business model based thereon and in response to a detected change in an artifact, feature, question, etc.

Accordingly, developer system 12 forwards business question selections and associated identifications, descriptions, and/or configuration information (e.g., as may be provided responsive to developer manipulation of query-selection and layout options screen 28) to business planning model generation framework 14. In addition, various additional UI controls included among developer UI display screens 26 may enable specification and forwarding of additional information to planning model generation framework 14, including, but not limited to additional business model configuration information, e.g., model artifact specifications, an artifact file listing artifacts for an initial business planning model, component (e.g., UI control) dependencies (between UI controls to be rendered and exposed via cloud-deployed package 54), artifact grouping information, feature-artifact mapping data, delta file specifications (e.g., describing dependencies between various questions, artifacts, and/or features), feature specifications, flex dimension configuration parameters and/or specifications, and so on.

Business planning model generation framework 14 then processes the inputs received via developer system 12 to automatically construct an initial business planning model, also called the seed model. Some example modules usable to construct initial dynamic business planning model 18 and to implement incremental updates thereto, include, but are not limited to flex dimension framework 36, feature-artifact mapping module 38, runtime model generator 40, dynamic integrator 42, and UI generator 44.

Flex dimension framework 36 includes computer code for enabling customer administrators (e.g., using customer administrator system 22) and/or customer end users (e.g., using customer end-user system 14) to add flex dimensions to various UI display screens exposed via cloud-deployed package 54. Flex dimension framework 36 then enables extension of business planning model 18 in accordance with the added flex dimensions. Note that whether initial business planning model 18 supports flex dimensions, which flex dimensions, if any, are supported, and behaviors of the flex dimensions, may be specified by a developer via one or more UI controls provided in developer UI display screens 26.

Feature-artifact mapping module 38 includes computer code for enabling automatic implementation of changes introduced to dynamic business planning model 18 in response to answers provided in response to business questions posed to an administrator (or other authorized user) of customer administrator system 22. In particular, when an administrator provides a new answer to a question (e.g., which may be posed via a UI prompt, such as a check box), any artifacts associated with the question are then automatically populated with features via feature-artifact mapping module 38. The resulting populated artifacts are then incorporated into updated dynamic business planning model 18 after any artifact and/or feature dependencies are handled and/or deltas are processed.

Runtime model generator 40 includes computer code for automatically generating a new or updated dynamic business planning model 18 for incorporation into cloud-deployed package 54. The updates to running cloud-deployed package 54 by runtime model generator 40 may be implemented via patching and/or other known technologies for adjusting running software applications.

Dynamic integrator 42, which may communicate with other modules of planning model generation framework 14, facilitates implementing delta differencing processing to accommodate newly added functionality without introducing conflicts in updated business planning model 18. Integrator 42 may further include computer code for facilitating and/or ensuring efficient interoperability between different intercommunicating business planning models and associated software applications deployed via packaging, delivery, deployment, and runtime system 20.

Note that information exchange between developer system 12 and between various cloud-based modules 14-20 may be implemented via exchange of XML files that are also transferred between the system and modules. Furthermore, dynamic business planning model 18 may be implemented substantially via an XML document defining the model.

In some implementations, dynamic business planning model 18 includes a model adaptation module 46, which includes computer code for facilitating some self-adaptation of dynamic business planning model 18. Note that in other implementations, model adaptation module 46 may be included instead in planning model generation framework 14.

In some implementations, model adaptation module 46 includes, in addition to a description of the business planning model (including a description of existing questions, artifacts, and associated features), a specification of code for dynamic question generator 50 and answer incorporator 52.

Dynamic question generator 50 may include computer code (and/or links thereto) for automatically adjusting a list of business questions exposed via a UI of customer administrator system 22, e.g., in response to one or more answers provided thereby by an administrator using customer administrator system 22. This may be particularly useful for reconfiguring listing of displayed questions in response to an answer to a question that affects the validity of other questions displayed in (or to be displayed among) the listing of business questions.

Answer incorporator 52 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 22).

Note that various modules 36-44 of the business planning model generation framework 14 may intercommunicate, e.g., via interfacing functionality incorporated therein. Similarly modules 48-52 of model adaptation module 46 of dynamic business planning model 18 may intercommunicate.

Once initial business planning model 18 is developed and/or configured via developer system 12, it can be deployed as cloud-deployed package 54, which is then made available to customer administrator system 22 and customer end-user system 24. The customer administrator may then use customer administrator system 22 to answer business questions. The resulting answers then feed back to framework modules 14-20, which then adapt or update dynamic business planning model 18 in accordance with the answers. The adjustment to dynamic business planning model 18 is effectuated through use of artifacts, which are then mapped or seeded with features corresponding to the answered questions, and in accordance with the answers to the answered questions, as discussed more fully below.

Accordingly, the present example implementation may enable customers to substantially forgo, configuring and/or updating business planning software. Several business planning processes (which may be associated with different business planning models and/or sub-models) may be selectively and incrementally rolled out to customer end users (e.g., users of customer end-user system(s) 24). Furthermore, integration between added features (e.g., sets of software functionality associated with different business processes) is automatically accommodated, e.g., via dynamic integrator 42 and feature-artifact mapping module 38 of business planning model generation framework 14.

Furthermore, by enabling customer addition of and configuration of flex dimensions to dynamic business planning model 18, the resulting automatically handled dimensions can significantly reduce implementation time for customers to implement new features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using system 100 may now readily evolve and adapt to meet different and/or changing business needs while remaining consistent with industry-standard best practices. Furthermore, as best practices change, dynamic business planning model 18 may adapt to comply with the new best practices.

Figure 2:
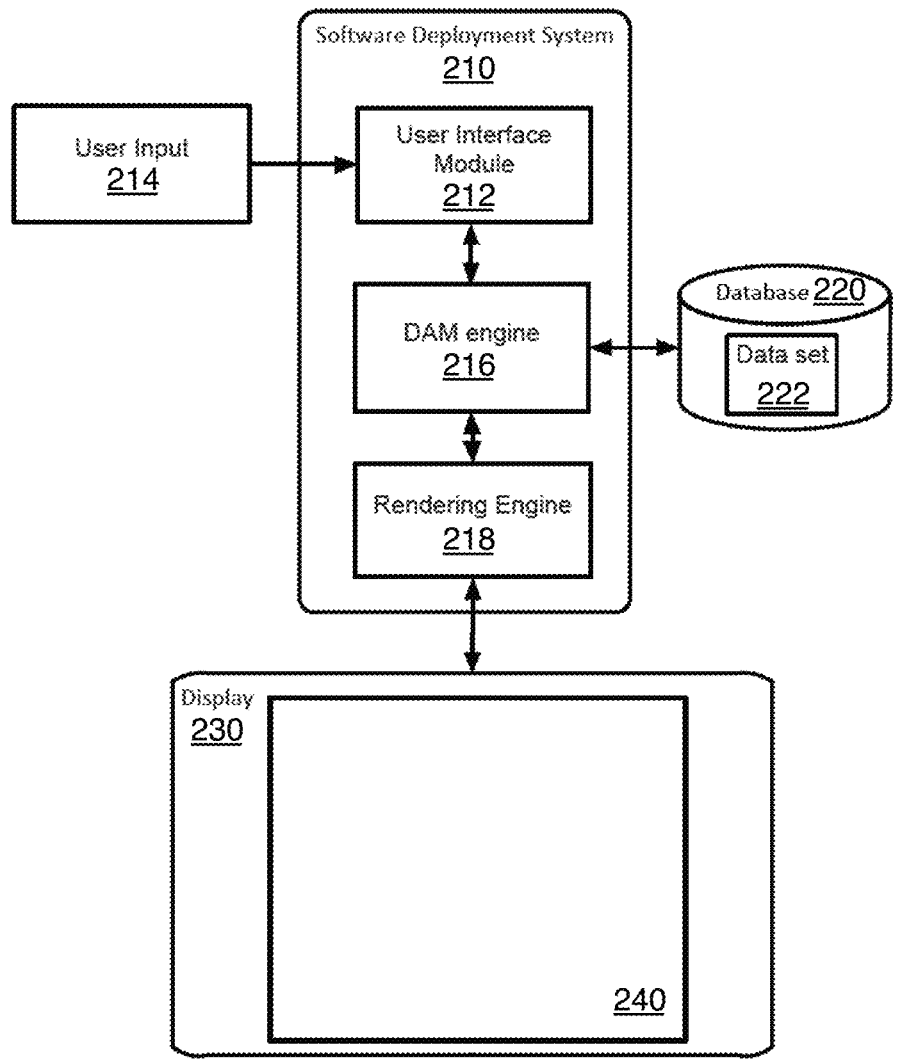
FIG. 2 illustrates an example block diagram of a computing system, which may be used for implementations described herein.

FIG. 2 illustrates an example block diagram of a computing system 200, which may be used for implementations described herein. Computing system 200 provides an interface layer, such as an application program interface (API). The interface layer provides users with seamless connectivity between different instantiations of an application located in different environments (e.g., development environment, production environment, etc.). Computing system 200 may be any computing system, such as an enterprise computing environment, client-server system, and the like.

Computing system 200 also includes software management system 210, also referred to herein as software deployment system 210. Software management system 210 may include a user interface module 212. User interface module 212 may be configured to receive and process data signals and information received from a user interface 214, also referred to herein as user input 214. For example, user interface module 212 may be adapted to receive and process data from user input associated with data for processing via software management system 210. Software management system 210 is configured to process data received from user interface 214, such as a keyboard, mouse, etc. for receiving user input.

Software management system 210 may also include a process engine 216, also referred to herein as digital asset management (DAM) engine 216, and a rendering engine 218. Process engine 216 may be configured as an API or any interface or data structure that may be used to advantage.

In some implementations, computing system 200 may include a data source such as database 220. Database 220 may be connected to the software management system 210 directly or indirectly, for example via a network connection, and may be implemented as a non-transitory data structure stored on a local memory device, such as a hard drive, solid state drive (SSD), flash memory, and the like, or may be stored as a part of a cloud network, as further described herein.

Database 220 may contain one or more data sets 222. Data sets 222 may include data as described herein. Data sets 222 may also include data pertaining to data attributes, data hierarchy, nodal positions, values, summations, types of charts of visualizations, algorithms, code (e.g., C++, Javascript, JSON, etc.), source, security, hashes, XML, and the like. In addition, data sets 222 may also contain other data, data elements, and information such as metadata, labels, development-time information, run-time information, configuration information, API, interface component information, library information, pointers, and the like.

In various implementations, software management system 210 is connected to a display 230 configured to display data 240 (e.g., graphical data, etc.), for example, to a user thereof. Display 230 may be a passive or an active display, adapted to allow a user to view and interact with display data 240 displayed thereon, via user interface 214. In other configurations, display 230 may be a touch screen display responsive to touches, gestures, swipes, and the like for use in interacting with and manipulating display data 240 by a user thereof. Gestures may include single gestures, multi-touch gestures, and other combinations of gestures and user inputs adapted to allow a user to convert, model, generate, deploy, and maintain display data 240.

In various implementations, process engine 216 may be adapted to receive data from user interface 214 and/or database 220 for processing thereof. In one configuration, process engine 216 is a software engine configured to receive and process input data from a user thereof pertaining to display data 240 from user interface 214 and/or database 220 in order to provide the process API layer.

Process engine 216 in other implementations may be configured as a data analysis tool to perform analysis functions associated with display data 240. Such analysis functions may include determining attributes associated with the data, partitions, local and remote pods (layers), communication protocols, determining the relationships to other data, interpreting metadata associated with the data, and the like. For example, process engine 216 may be configured to receive and analyze data sets 222 to determine user interface configuration, data processing instructions, data attributes, data hierarchy, nodes, nodal positions within the hierarchy, values, summations, algorithms, source, security, hashes, and the like, associated with data sets 222.

Process engine 216 may receive existing data sets 222 from database 220 for processing thereof. Such data sets 222 may include and represent a composite of separate data sets 222 and data elements pertaining to, for example, organizational data, which may include employment data, salary data, personnel data, and the like. In addition, data sets 222 may include other types of data, data elements, and information such as contact data, sales data, production data, scientific data, financial data, medical data, census data, and the like.

Rendering engine 218 may be configured to receive configuration data pertaining to display data 240, associated data sets 222, and other data associated with display data 240 such as user interface components, icons, user pointing device signals, and the like, used to render display data 240 on display 230. In one exemplary implementation, rendering engine 218 may be configured to render two-dimensional (2D) and three-dimensional (3D) graphical models and simulations to allow a user to obtain more information about data sets 222. In one implementation, upon receiving instruction from a user, for example, through user interface 214, rendering engine 218 may be configured to generate a real-time display of interactive changes being made to display data 240 by a user thereof.

Note that the computing system 200 presents a particular example implementation, where computer code for implementing embodiments may be implemented, at least in part, on a server. However, embodiments are not limited thereto. For example, a client-side software application may implement software management system 210, or portions thereof, in accordance with the present teachings without requiring communications between the client-side software application and a server.

FIG. 3 illustrates an example user interface 300, according to some implementations. User interface 300 shows a palette 302 and a process 304. As described in more detail below, a system enables a user to select process elements from palette 302 of user interface 300 in order to build a process such as process 304. In various implementations, process elements are process components that represent the work performed within a process such as a business process. Process elements may also be referred to as objects, nodes, process nodes, or process flow nodes. Various types of process elements and their functions are described in more detail herein.

Palette 302 includes various process elements from which a user can select in order to include in a process such as process 304. Palette 302 may be referred to as a process element palette or elements palette. In various implementations, palette 302 also includes process element groups, which are categories of process elements, and palette 302 organizes and groups process elements into the process element groups. In some implementations, categories of process elements may be based on function. In this context, process element groups are functional groups in that process elements associated with a particular process element group may have a particular function corresponding to that process element group. In some implementations, categories of process elements may be based on what entity performs the process elements. For example, as described in more detail herein, a human task process element involves a user performing particular tasks, and a system task process element involves the system performing particular tasks.

In various implementations, different process elements may have different functions yet may be associated or grouped in the same process element group based on a shared functional characteristic. For example, a gateway process element group may include process elements that perform different system tasks such as splitting a process path into two or more process paths, merging two or more process paths into a single process path, and so on. In this particular example implementation, such process elements share the common functional characteristic of directing process paths in the process. The particular functional characteristic may vary from process element group to process element group, depending on the implementation. Further examples of process elements and process element groups are described in more detail herein.

A group name and/or group icon is associated with each process element group. Each group name and/or group icon identifies a process element group. The system displays the group names and group icons of the process element groups in the palette. The user may click on the name or icon displayed in the palette, which in turn expands the corresponding element group.

Shown are a human task process element group 306, a system task process element group 308, an event process element group 310, a gateway process element group 312, and an "other" process element group 314. Example implementations of these process elements groups are described in more detail herein.

In various implementations, when a user selects (e.g., clicks, etc.) a process element group, the system enables the user to expand one or more of the process element group in palette 302 in order to show one or more process elements associated with the process element group. More specifically, the system expands a portion of the palette associated with the element group in order to show or reveal the process elements. In some implementations, one or more process element groups may be opened at the same time. In some implementations, palette 302 may be hidden with a button on top of it (e.g., a button in the toolbar or in the palette). The user may select and add process elements to the process in the workspace, also referred to as a canvas. For example, as described in more detail herein, the user may drag and drop one or more elements on to the workspace to add to the process.

In some implementations, one or more process elements may be associated with a human task process element group 306. Human task process element group 306 includes human task process elements, which represent human or user tasks or interactions. Shown are a human task process element 316 (labeled "Submit") and a human task process element 318 (labeled "Approve"). While human task process elements 316 and 318 represent tasks that users perform, human task process elements 316 and 318 involve the system receiving user input and processing such user input accordingly. For example, in some implementations, human task process element 318 may represent a user such as a loan applicant submitting a loan application, where the system receives the loan application. Human task process element 318 may represent a user such as a loan officer approving or not approving the loan associated with the loan application.

In some implementations, one or more process elements may be associated with a system task process element group 308. In various implementations, system task process element group 308 includes system task process elements, which represent system actions or tasks. For example, the system may post an item in a social network. In another example, the system may update a human resources database, update an external system, etc. In some implementations, a task process element have an associated time limit, where the task process element causes the system to perform a task after a predetermined amount of time of an event or absence of an event.

In some implementations, one or more process elements may be associated with an event process element group 310. In various implementations, event process element group 310 includes event process elements, which represent events that occur during a process. For example, an event may be an occurrence of a loan application being approved or not approved. In some implementations, an event may satisfy a condition associated with another process element type such as a task process element. For example, if loan application is approved or not approved, a task process element may cause the system to send out an alert or notification (e.g., to another system, to a user such as a boss, etc.).

In some implementations, one or more process elements may be associated with a gateway process element group 312. In various implementations, gateway process element group 312 includes gateway process elements, which represent the process path determinations. In some implementations, gateway process element group 312 causes the system to perform tasks related to establishing particular process paths. For example, gateway process elements may functions to split or merge paths. As indicated above, a gateway process element group may include gateway process elements that perform different system tasks such as splitting a process path into two or more process paths, merging two or more process paths into a single process path, and so on. Such process elements share the common functional characteristic of directing process paths in the process. In various implementations, one or more continuous process paths in a process may be referred to as a process flow in that a process flow determines the direction information flow in a process and the process elements along the process paths. The particular functional characteristic may vary from process element group to process element group, depending on the implementation. In some implementations, gateways may be used for paths that are exceptions to, or deviate from, a default path of a process. ☐

In an example implementation, whether a particular loan gets approved or not may determine the process path. In some implementations, gateway process element 312 may be event-based where a particular process path is determined by events rather than data conditions.

In some implementations, one or more process elements may be associated with "other" process element group 314. In various implementations, "other" process element group 314 includes various process elements. Such as process elements may include start process elements, end process elements, sequence flow process elements, and so on.

In various implementations, sequence flow process elements represent connections between process elements. In various implementations, where such connections are directional (e.g., indicated with arrows). In other words, a sequence flow process element generates a process path that flows in a particular direction from one process element to another process element. A start process element represents the start or initiation of a process. An end process element represents the end or termination of a process. Example implementations of these process element types are described in more detail herein.

As shown, process 304 includes process elements such as a human task process element 320 (labeled "User Task"), a start process element 322 (labeled "Start"), and an end process element 324 (labeled "End"). In various implementations, start process element 322 may represent different types of start events. For example, a start event may be a document start event, where a process is initiated by a user opening a document or opening a folder. In some implementations, a start event may be a message start event, where a process is initiated when the system receives a particular message from another process or a service. In some implementations, a start event may be a message start event, where a process is initiated when the system receives a form (e.g., a loan application, and so on) from a user.

In various implementations, the system enables a user to select process elements (e.g., select icons or labels of process elements) from palette 302 to be added to a process. For example, in some implementations, the system enables the user to drag and drop process elements from palette 302 into workspace 326. After the user drags and drops sequence flow process elements into workspace 326, the system enables the user to connect particular process elements in workspace 326 using the sequence flow process elements. For example, sequence flow process element 328 connects start process element 322 to human task process element 320. As indicated by the arrow shown, sequence flow process element 328 generates a process path that flows in the direction of start process element 322 to human task process element 320. Sequence flow process element 330 connect human task process element 320 to end process element 324. As indicated by the arrow shown, sequence flow process element 330 generates a process path that flows in the direction of human task process element 320 to end process element 324.

Figure 4:
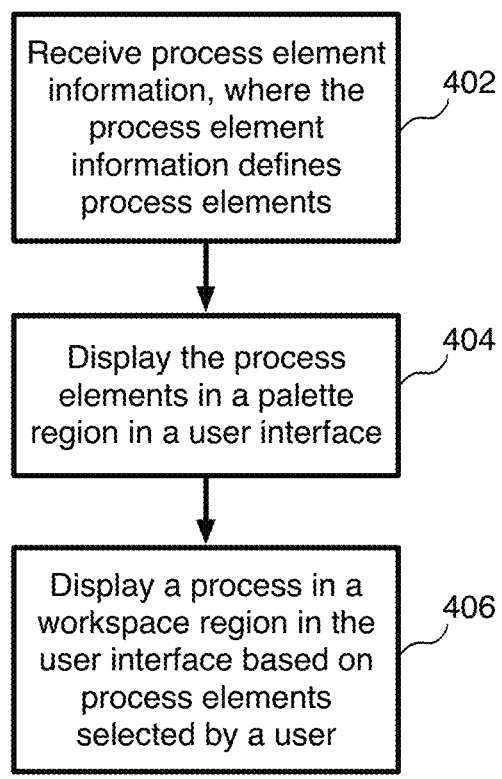
FIG. 4 illustrates an example flow diagram for facilitating process building, according to some implementations.

FIG. 4 illustrates an example flow diagram for facilitating process building, according to some implementations. Referring to FIGS. 3 and 4, a method is initiated at block 402, where a system such as a client device receives process element information, where the process element information defines process elements, where the process elements are nodes displayed in a process, and where the process☐ elements are associated with process element groups based on categories. The process elements are arranged in a palette such as palette 302, and arranged for a user to select process elements to build a process. The process element information may also be referred to as palette information.

The system may be a system residing on a client device such as developer computer system 12 of FIG. 1, where the system receives the process element information from another system such as planning model generation framework 14 of FIG. 1. In some implementations, the process element information may be in a JavaScript object notation (JSON). In various implementations, the server may change the process element information, which in turn changes what process elements that the palette renders. In some scenarios, if one process is merged or integrated with another process, the server may change the process element information so that the palette reflects any such changes.

At block 404, the system displays the process elements such as process elements 316 and 318 in a palette region or palette 302 in user interface 300 of the client device. In some implementations, palette 302 may be hidden with a hide button above it. The hide button may be located in a toolbar or in palette 302 (e.g., next to the group name).

In various implementations, in addition to the process element information defining process elements, the process element information also defines one or more process element groups and associates one or more process elements with one or more of the process element groups, respectively. As indicated herein, these process element groups may also be referred to as functional groups in that process elements in a given process element group have a particular function. The client device causes one or more of the process elements to be displayed in one or more respective process element groups in palette 302. The process element groups are categories of process elements. In various implementations, the client device organizes the process elements in process element groups in palette 302 based on the process element information.

In some implementations, when a process is built or when multiple processes or sub-processes are integrated, the software management system may automatically add process element information associated with various process elements of each process to the palette. Such additions may be based on new combinations and configurations of process elements in the process. As a process grows or when two or more process elements are combined or integrated, there additional types of gateway process elements that may be useful to the user may be added to the palette, which automatically updates palette 302. For example, exclusive gateway process elements, inclusive process elements, parallel process elements, and event-based process elements may be added.

In some implementations, an exclusive gateway process element splits a process into multiple process paths, where the flow of the process, or process flow, continues down one of the process paths. Decisions about which process path the process should proceed along may be based on data-specific conditions. In some implementations, an inclusive process element splits a process into multiple process paths, where the process flow can continue down multiple process paths depending on conditional sequence flow. In some implementations, a parallel process element splits a process into multiple process paths, where the process flow continues down all paths simultaneously. In some implementations, an event-based process element splits a process into multiple process paths, where the process flow continues down one of the process paths. An event-based gateway is similar to an exclusive gateway in that both types of process elements may involve one process path in the process flow. However, in some implementations, for an event-based gateway, decisions about process flow may be based on an event taking place rather than a condition being met. Other types of process elements are possible, depending on the implementation.

In some implementations, some of these process element types and other may be initially included in the palette. To keep the palette from being too complex for users, some process elements may be added later as needed. Adding process elements as needed simplifies the palette for usability.

This enables processes to be scalable, as new integrations and services can be added. As indicated herein, this may be implemented using planning model generation framework 14 of FIG. 1 and/or software deployment system 210 of FIG. 2. This provides flexibility to developers as process elements are automatically added to the palette. In some implementations, the system enables a user may create new process elements and add such process elements to the palette.

At block 406, the system displays process 304 in a workspace region such as workspace 326 in the user interface based on process elements from the palette region that are selected by a user. Workspace region may also be referred to as a workspace, canvas, or canvas region. Implementations enable a user to easily add or remove process elements or tasks to or from a given process. As indicated herein, the system enables a user to drag and drop process elements from palette 302 into workspace 326. The system enables the user to drop each element anywhere within the workspace.

The system also enables the user to connect process elements such using sequence flow process elements, which builds the process such as process 304. In this example implementation, process 304 includes start process element 320, human task process element 322, and end process element 324. As indicated herein, in various implementations, the process elements of process have particular functions that execute or carry out a process such as a business process. For example, in the example implementation shown, process 304 may be initiated at start process element 322 (e.g., a received message). Human task process element 320 may receive user input or interaction (e.g., a form submission). Process 304 may end or terminate at end process element 324 (e.g., a notification).

Once process 304 is complete it may be executed. For example, the system enables the user to initiate and run process 304 from user interface 300, which may be implemented on developer computer system 12 of FIG. 1, which is in communication with planning model generation framework 14. In various implementations, after deployment of process 304, packing, delivery, deployment and runtime system and/or computing framework 20 enables customers and end users via customer administrator system 22 and customer end-user system 24 of FIG. 1 to interact with process 304. For example, a human task process element may receive user input or interaction during a process. In various implementations, business planning model 18 of FIG. 1 may perform system operations associated with process 304. For example, system task process elements cause the system to perform tasks based on human task process element, event process elements and other process elements.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 5 illustrates an example user interface 500, according to some implementations. As shown, the user may build a process of varying complexity. In some implementations, the workspace may include multiple domain regions, and the process may include multiple sub-processes, where each domain region is associated with a different sub-process. In various implementations, each domain region is associated with a particular type of end user. For example, one domain region may be associated with a loan applicant end user, and another domain region may be associated with a loan officer end user. This enables a user such as a developer user to build a process that involves multiple users such as end user.

In various implementations, the system enables the process to be separated into multiple domains (e.g., owner domain, reviewer domain, etc.), where each domain is associated with a different sub-process. As such, the workspace may have multiple domain regions, where each domain region displays a different sub-process.

For example, referring still to FIG. 5, the workspace may include a process owner region 502 and a process reviewer region 504. Also, the process may be separated into multiple portions or sub-processes such as a process owner sub-process 512 and a process reviewer sub-process 514. Process elements that are located in the process owner region are associated with the process owner sub-process 512. A process owner user may be an end user such as person providing a loan application to a bank. In this example implementation, in the process owner region, at a process element 522, the system receives an application form from the owner user. The owner user may fill out and submit the form in a UI provided by the system to a client device. At a process element 524, the system may enable the owner user to resubmit the loan application if needed.

In some implementations, process elements that are located in the process reviewer region are associated with the process reviewer sub-process 514. A process reviewer user may be a loan officer at a bank reviewing the loan application. For example, in the process reviewer region, at a process element 532, the system enables a reviewer user such as a loan officer to review the loan application. At a process element 534, the system determines of the loan application is approved based on the process element 532. If not approved, process element directs the process path to process element 524 in order to enable the owner user to resubmit the application form. In various implementations, process element 534 is a gateway process element in that process element 534 directs the process path in the process. After the owner user resubmits the application form at process element 524, the system enables the reviewer user to review the application form at process element 532.

Continuing with this example, if the loan application is approved, process element 534 directs the process path to process element 536, where the system enables the reviewer user to fulfill the loan at process element. After the loan is fulfilled, the process ends at process element 538. As shown, the process owner user and process reviewer user are involved in separate portions of the process, or sub-processes 512 and 514. In various implementations, FIG. 5 may not have all of the sub-processes shown and/or may have other sub-processes including other types of sub-processes instead of, or in addition to, those shown herein. Similarly, sub-processes 512 and 514 of system 500 may not have all of the process elements shown and/or may have other process elements including other types of process elements instead of, or in addition to, those shown herein.

In some implementations, the sub-processes in a given canvas may be separated by a boundary displayed in the canvas. Such a boundary may be referred to as a swim lane. For example, referring still to FIG. 5, boundary 542 separates sub-processes 512 and 514. In various implementations, boundary 542 functions to create display areas for two sub-processes. More boundaries may be added in order to create display areas for separate sub-processes. For example, in various implementations, the system assigns roles to boundaries and determines which sub-processes perform particular tasks in the process, and well as which users are associated with which sub-processes.

FIG. 6 illustrates an example user interface 600, according to some implementations. User interface 600 includes another example process with a sophisticated process 602. In some implementations, a start process element may initiation the process based on an event. For example, in some implementations, a process element 604 may trigger a process instance when a user submits a form.

In some implementations, the system enables a service task in the process to communicate with other processes and services. Such service tasks may, for example, invoke an external service or process.

In various implementations, the system may use one or more structural rules at particular process elements to perform calculations used within a process. For example, the system may use a structural rule to calculate a credit score. In some implementations, the system may use one or more operative rules at particular process elements to make changes to the flow of your business process. For example, the system may use an operative rule to perform a check of the rule conditions. Then, as part of an output data association, the system may assign a value to a data object using an expression. In this scenario, a decision task may be immediately followed by a gateway that is used to branch the process path according to the value of a data object. □

Figure 7:
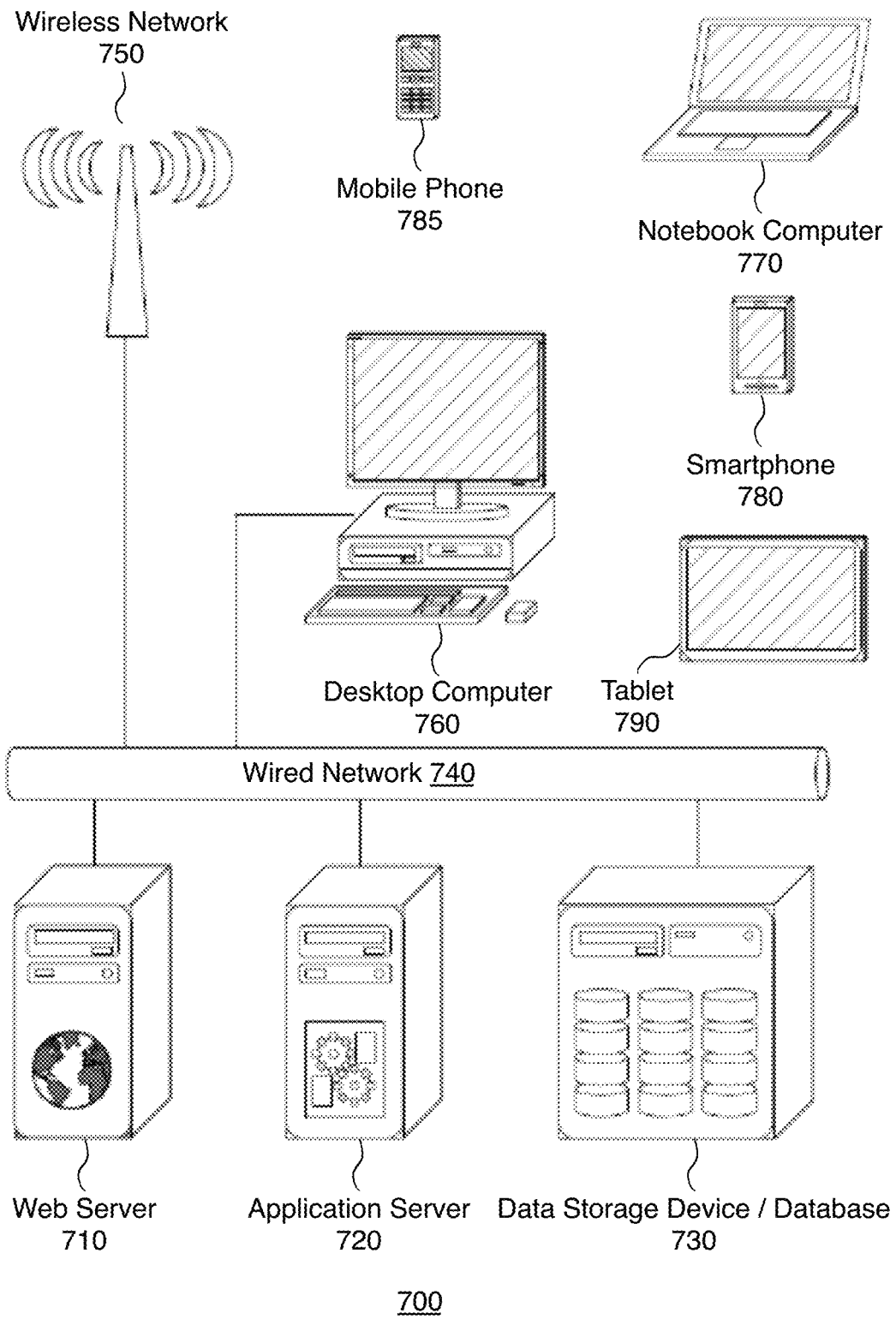
FIG. 7 illustrates an example block diagram of a system, which may be used for implementations described herein.

FIG. 7 illustrates an example block diagram of a system 700, which may be used for implementations described herein. Example system 700 is capable of supporting or running various hardware and/or software modules and associated methods discussed with reference to FIGS. 1-6. Note that certain implementations may be implemented using one or more standalone applications (for example, residing in a user device) and/or one or more web-based applications implemented using a combination of client-side and server-side code. While system 700 performs implementations described herein, in other implementations, any suitable component or combination of components associated with system 700 or any suitable processor or processors associated with system 700 may facilitate performing the implementations described herein. In various implementations, system 700 may not have all of the components shown and/or may have other elements including other types of components instead of, or in addition to, those shown herein.

General system 700 includes user devices 760-790, including one or more desktop computers 760, one or more notebook computers 770, one or more smartphones 780, one or more mobile phones 785, and one or more tablets 790. General system 700 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although system 700 is shown with five user devices, any number of user devices can be supported.

A web server 710 is used to process requests from web browsers and standalone applications for web pages, electronic documents, enterprise data or other content, and other data from the user computers. Web server 710 may also provide push data or syndicated content, such as RSS feeds, of data related to enterprise operations.

An application server 720 operates one or more applications. The applications can be implemented as one or more scripts or programs written in any programming language, such as Java, C, C++, C #, or any scripting language, such as JavaScript or European computer manufacturers association script (ECMAScript), Perl, hypertext preprocessor (PHP), Python, Ruby, or tool command language (TCL). Applications can be built using libraries or application frameworks, such as Rails, Enterprise JavaBeans, or .NET. Web content may be created using hypertext markup language (HTML), cascading style sheets (CSS), and other web technology, including templating languages and parsers.

The data applications running on application server 720 are adapted to process input data and user computer requests and can store or retrieve data from a data storage device or database 730. Database 730 stores data created and used by the data applications. In some implementations, database 730 includes a relational database that is adapted to store, update, and retrieve data in response to SQL format commands or other database query languages. Other implementations may use unstructured data storage architectures and Not Only SQL (NoSQL) databases.

In some implementations, application server 720 includes one or more general-purpose computers capable of executing programs or scripts. In some implementations, web server 710 is implemented as an application running on the one or more general-purpose computers. Web server 710 and application server 720 may be combined and executed on the same computers.

An electronic communication network 740-750 enables communication between user computers 760-790, web server 710, application server 720, and database 730. In some implementations, networks 740-750 may further include any form of electrical or optical communication devices, including wired network 740 and wireless network 750. Networks 740-750 may also incorporate one or more local-area networks, such as an Ethernet network, wide-area networks, such as the Internet; cellular carrier data networks; and virtual networks, such as a virtual private network.

System 700 is one example for executing applications according to some implementations. In some implementations, application server 710, web server 720, and optionally database 730 can be combined into a single server computer application and system. In further implementations, virtualization and virtual machine applications may be used to implement one or more of application server 710, web server 720, and database 730.

In still further implementations, all or a portion of the web and application serving functions may be integrated into an application running on each of the user computers. For example, a JavaScript application on the user computer may be used to retrieve or analyze data and display portions of the applications.

In various implementations, system 700 may not have all of the components shown and/or may have other elements including other types of components instead of, or in addition to, those shown herein.

With reference to FIGS. 1, 2, and 7, developer system(s) 12, customer administrator system(s) 22, and customer end-user system(s) 24 of FIG. 1 may be implemented in whole or in part via one or more of desktop computer 760, notebook computer 770, smartphone 780, mobile phone 785, and tablet 790 of FIG. 7 and/or other computing devices such as computing system 200 of FIG. 2. In some implementations, computing devices 760-790 run browsers, e.g., used to display developer UI(s) 26 and UIs of customer administrator system(s) 22 and customer end-user system(s) 24 of FIG. 1. Examples of such UIs are shown in FIGS. 3, 5, and 6.

In some implementations, browsers of systems 12, 22, 24 of FIG. 1 connect to the Internet, represented by wired network 740 and/or wireless network 750 as shown in FIG. 7, to access one or more network-coupled servers, databases, and/or associated cloud-based functionality, as represented by modules 14-20 of FIG. 1. Note that one or more of web server 710, application server 720, and data storage device or database 730 shown in FIG. 7 may be used to host software corresponding to modules 14-20 of FIG. 1, as detailed more fully below.

In some implementations, model artifact constructor 16, planning model generation framework 14 (including accompanying flex dimension framework 36, feature-artifact mapping module 38, runtime model generator 40, dynamic integrator 42, and UI generator 44), dynamic business planning module 18 and accompanying model adaptation module 46 (including model specifications 48, question generator 50, and answer incorporator 52), and packaging, delivery, deployment, and runtime system 20 (and accompanying cloud-deployed package 54) of FIG. 1 run in a cloud computing environment that includes a collection of plural web servers 710, application servers 720, and data storage devices 730 shown in FIG. 7.

For example, in some implementations, planning model generation framework 14 and model artifact constructor 16 of FIG. 1 run on a process cloud that communicates with a document cloud via an integration mechanism, e.g., middleware, APIs, web services, etc. The document cloud maintains data storage devices 730 of FIG. 7 to maintain data that is generated by customers, e.g., via customer end-user systems 24 of FIG. 1 through use of cloud-deployed package 54. The process cloud in combination with the document cloud act as an overall cloud that supports development, deployment, dynamic adaptation, and use of dynamic software applications and accompanying models (e.g., dynamic business planning model 18 of FIG. 1) shown in FIG. 1.

In general, software developers e.g., users of developer systems 12 of FIG. 1, may subscribe to certain cloud services to facilitate development of software applications and storage of associated files. A cloud service that is configured for software application or process flow development is called a process cloud service (PCS).

A process cloud service may employ a networked database, e.g., data storage device 730 of FIG. 7 or database 220 of FIG. 2, to store files and other objects used by a given software program being developed. Server-side development environments may be accessible to developers via browsers. The development environments may be backed by the PCS, such that developed software application files are stored in the PCS database corresponding to the one or more of data storage devices 730 of FIG. 7 or database 220 of FIG. 2.

A document cloud may include document management functionality in communication with folder structures, and documents and may incorporate functionality for adding rich metadata documents and folders. The document management functionality may include metadata services (MDS) for characterizing folders and documents and associated structures with various types of metadata. The document management functionality may further include software (which may include a combination of webpage code from web server 710 of FIG. 7 and supporting application code of application server 720 of FIG. 7, where the webpage code may call the application code using web services, APIs, etc.) for generating one or more customer UI display screens, e.g., UI display screens presented via browsers of customer administrator systems 22 and customer end-user systems 24 of FIG. 1.

In some implementations, the UI display screens (examples of which are shown in FIGS. 3, 5, and 6) include accompanying UI controls and associated options. Example options include options to browse, create, delete, define, upload, download, etc., folders, structures, and documents, etc., as maintained via the folder structures and documents.

In some implementations, browsers used by developer system 12, customer administrator system 22, and customer end-user system 24 of FIG. 1, interface with web servers 710 shown in FIG. 7 to access websites and accompanying webpage code, which is backed by applications used to implement modules 16-20 of FIG. 1. The webpage code of web servers 710 of FIG. 7 uses web services, APIs, and/or other interfacing mechanisms to communicate with application software hosted on application servers 720 of FIG. 7 of the cloud, which includes a collection of web servers 710, application servers 720, and data storage devices 730 of FIG. 7.

Various implementations discussed herein may provide substantial benefits in terms of providing efficiencies in systems and methods that achieve a new and useful end as they pertain to new software adaptability. In particular, certain implementations discussed herein uniquely leverage input from customers, the input of which may change over time as user needs change, to enable substantial hereto-for-not possible or practical dynamic software model reconfiguration and/or reconstruction.

Certain implementations may provide virtually automatic incorporation of such inputs into a seamlessly adaptable software package that is responsive to the changing user needs and automatically seamlessly handles software integrations.

Accordingly, various implementations provide new capabilities for efficient software adaptation, in part by uniquely leveraging associations between user-provided answers to questions, sets of software model artifacts, sets of software functionality, and mappings or relationships.

Figure 8:
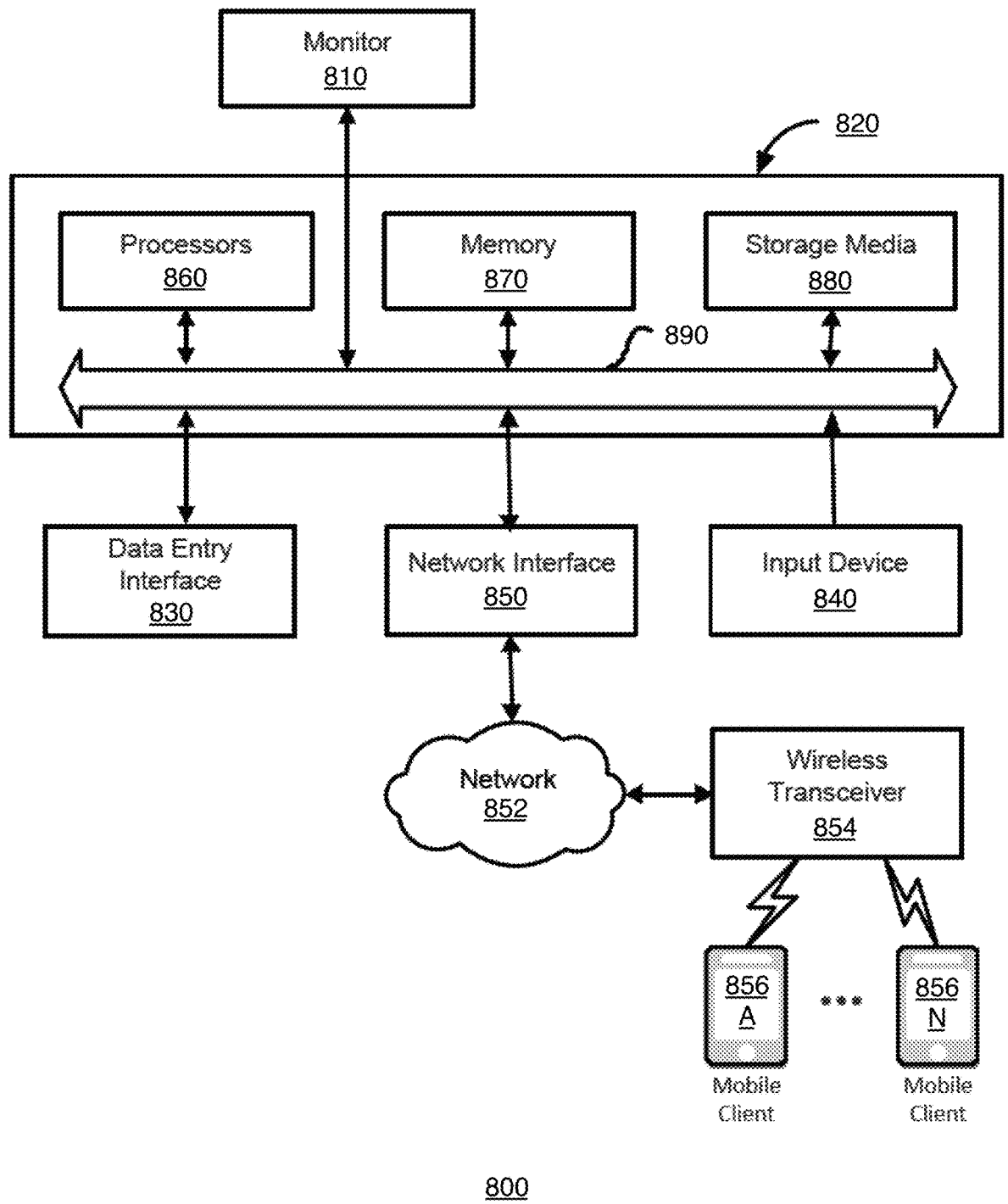
FIG. 8 illustrates an example block diagram of a network environment, which may be used for implementations described herein.

FIG. 8 illustrates an example block diagram of a network environment 800, which may be used for implementations described herein. Network environment 800 is merely illustrative and not intended to limit the scope of the claims. One of ordinary skill in the art would recognize other variations, modifications, and alternatives. For example, network environment 800 may be implemented in a distributed client-server configuration having one or more client devices in communication with one or more server systems.

In one exemplary implementation, network environment 800 includes a display device such as a monitor 810, a computer 820, a data entry interface 830 such as a keyboard, touch device, and the like, an input device 840, a network interface 850, and the like. Input device 840 is typically implemented as a computer mouse, a trackball, a track pad, wireless remote, tablet, touch screen, and the like. Moreover, input device 840 typically allows a user to select and operate objects, icons, text, characters, and the like that appear, for example, on the monitor 810.

Network interface 850 may include an Ethernet card, a modem (telephone, satellite, cable, integrated services digital network (ISDN), etc.), an (asynchronous) digital subscriber line (DSL) unit, and the like. Furthermore, network interface 850 may be physically integrated on the motherboard of computer 820, may be a software program, such as soft DSL, or the like.

Network environment 800 may also include software that enables communications over a communication network 852 such as the hypertext transfer protocol (HTTP), transmission control protocol/Internet protocol (TCP/IP), real-time transport protocol/real-time streaming protocol (RTP/RTSP), protocols, wireless application protocol (WAP), Institute of Electrical and Electronics Engineers (IEEE) 802.11 protocols, and the like. In addition to and/or alternatively, other communications software and transfer protocols may also be used, for example Internetwork packet exchange (IPX), user datagram protocol (UDP) or the like.

Communication network 852 may include a local area network, a wide area network, a wireless network, an Intranet, the Internet, a private network, a public network, a switched network, or any other suitable communication network, such as for example cloud networks. Communication network 852 may include many interconnected computer systems and any suitable communication links such as hardwire links, optical links, satellite or other wireless communications links such as Bluetooth, WIFI, wave propagation links, or any other suitable mechanisms for communication of information. For example, communication network 852 may communicate to one or more mobile wireless devices 856A-N, such as mobile phones, tablets, and the like, via a base station such as wireless transceiver 854.

Computer 820 may include familiar computer components such as one or more processors 860, and memory storage devices, such as a memory 870, e.g., random access memory (RAM), storage media 880, and system bus 890 interconnecting the above components. In some implementations, computer 820 is a PC compatible computer having multiple microprocessors, graphics processing units (GPU), and the like. While a computer is shown, it will be readily apparent to one of ordinary skill in the art that many other hardware and software configurations are suitable for use with implementations described herein. While computer 820 performs implementations described herein, in other implementations, any suitable component or combination of components associated with computer 820 or any suitable processor or processors associated with computer 820 may facilitate performing the implementations described herein. In various implementations, network environment 800 may not have all of the components shown and/or may have other elements including other types of components instead of, or in addition to, those shown herein.

Memory 870 and Storage media 880 are examples of non-transitory tangible media for storage of data, audio/video files, computer programs, and the like. Other types of tangible media include disk drives, solid-state drives, floppy disks, optical storage media such as compact disc-read only memory (CD-ROMS) and bar codes, semiconductor memories such as flash drives, flash memories, read-only-memories (ROMS), battery-backed volatile memories, networked storage devices, cloud storage, and the like.

Although the description has been described with respect to particular embodiments thereof, these particular embodiments are merely illustrative, and not restrictive. For example, while various implementations discussed herein address development, deployment, and use of dynamic business planning models used to implement cloud-based enterprise software applications and associated services, implementations are not limited thereto.

Various implementations need not be deployed via an Internet cloud, but instead may be hosted on an internal enterprise server on a local network. Furthermore various implementations may be implemented as desktop software, such that the incremental updating happens on the end-user computer on which the software leveraging the dynamic planning model runs. In addition, implementations are not limited to use in conventional business applications and computing environments, and may be used, for example, by governments, universities, and other organizations to facilitate various types of planning activities. In addition, implementations need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable storage medium carrying program instructions thereon, the instructions when executed by one or more processors cause the one or more processors to perform operations comprising:

receiving, at a developer-side user interface used by a developer user of a developer client device, process element information, wherein the process element information defines process elements, wherein the process elements include a start process element, an end process element, sequence flow process elements, a submit process element, an approve process element, system task process elements, event process elements, and gateway process elements, wherein the start process element represents different types of start events including a document start event and a message start event, wherein the sequence flow process elements represent directional connections between two of the process elements, and wherein arrows indicate a direction of the directional connections;

displaying the process elements in a palette region in the developer-side user interface on the developer client device, wherein the process elements include at least two process elements that perform different system tasks but share at least one common functional characteristic;

determining that two or more process elements are integrated;

automatically adding new process elements to the palette region in response to the determining that two or more process elements are integrated;

receiving user selection of a subset of process elements from the palette region, wherein the developer user interacting with the developer-side user interface of the developer client device selected the subset of process elements, wherein the user selected subset of process elements includes a new process element from the new process elements added to the palette region, and wherein the user selected subset of process elements are associated with an updated dynamic business planning model;

displaying a process in a workspace region in the developer-side user interface based on the user selected subset of process elements from the palette region;

determining if the user selected subset of process elements from the palette region are contained in sub-processes, wherein each of the subprocesses includes one or more of the process elements from the palette region;

if the user selected subset of process elements from the palette region are contained in the sub-processes, generating a number of domain regions within the workspace region equal to a number of different sub-processes that are associated with the sub-processes;

associating the submit process element and the approve process element with a human task process element group, wherein the submit process element and the approve process element represent tasks that users perform, and involve receiving and processing customer end user input;

associating a plurality of system task process elements with a system task process element group, wherein a first system task process element is associated with updating a human resource data base, a second system task process element is associated with updating an external system, a third system task process element is associated with a time limit, and a fourth system task process element is associated with sending an alert in response to an event;

associating an event process element group with event process elements representing events that occur during the process, wherein the events include a loan application being approved and the loan application being declined;

associating a gateway process element group with gateway process elements associated with splitting process paths, merging process paths, and process flows;

providing a gateway process element that is event-based for a particular process path;

providing a function that connects the start process element with a human task process element using a first sequence flow process element, wherein a first arrow associated with the first sequence flow process element generates a first process path from the start process element to the human task process element, and connecting the human task process element with the end process element using a second sequence flow process element, wherein a second arrow associated with the second sequence flow process element generates a second process path from the human task process element to the end process element;

providing a function that associates each of the domain regions with a type of customer end user, wherein an owner domain region is associated with a loan application end user and a reviewer domain region is associated with a loan officer end user, wherein an owner that provides the loan application is a customer end user that fills in a form for a loan application, and submits the form for the loan application, wherein a reviewer is a loan officer that reviews the loan application, wherein the approve process element, a decline process element, the sequence flow process elements, and a fulfill loan process element are associated with the reviewer domain region, and a resubmit process element and the submit process element are associated with the owner domain region, building a customer end-user software system including a customer end-user interface and based on the process displayed in the workspace region of the developer-side user interface, wherein the process is displayed based on the user selected subset of process elements with the sub-processes, and the domain regions;

deploying the process;

initiating the start process element with a received message;

receiving customer end user input from a form submission for the form of the loan application at the human task process element;

ending the process at the end process element, wherein the end process element is associated with a notification;

receiving customer administrator and customer end user interactions with the process via the customer end-user interface and a customer administrator user interface after the deploying;

wherein the process is a first process that receives loan applications and enables review of the loan applications;

building a second process using the developer-side user interface, wherein the second process performs credit processing; and triggering the second process when a form is submitted for credit processing, wherein the second process uses a process element that performs calculations and a process element with operative roles that make changes in flow of the second process.

2. The computer-readable storage medium of claim 1, wherein the instructions when executed further cause the one or more processors to perform operations comprising:

enabling the developer user to drag and drop the process elements from the palette region into the workspace region; and enabling the developer user to connect particular process elements in the workspace region using sequence flow process elements.

3. The computer-readable storage medium of claim 1, wherein the instructions when executed further cause the one or more processors to perform operations comprising enabling the developer user to expand one or more of the process element groups in order to show one or more of the process elements.

4. A method for facilitating process building, the method comprising:

receiving, at a developer-side user interface used by a developer user of a developer client device, process element information, wherein the process element information defines process elements, wherein the process elements include a start process element, an end process element, sequence flow process elements, a submit process element, an approve process element, system task process elements, event process elements, and gateway process elements, wherein the start process element represents different types of start events including a document start event and a message start event, wherein the sequence flow process elements represent directional connections between two of the process elements, and wherein arrows indicate a direction of the directional connections;

displaying the process elements in a palette region in the developer-side user interface on the developer client device, wherein the process elements include at least two process elements that perform different system tasks but share at least one common functional characteristic;

determining that two or more process elements are integrated;

automatically adding new process elements to the palette region in response to the determining that two or more process elements are integrated;

receiving user selection of a subset of process elements from the palette region, wherein the developer user interacting with the developer-side user interface of the developer client device selected the subset of process elements, wherein the user selected subset of process elements includes a new process element from the new process elements added to the palette region, and wherein the user selected subset of process elements are associated with an updated dynamic business planning model;

displaying a process in a workspace region in the developer-side user interface based on the user selected subset of process elements from the palette region;

determining if the user selected subset of process elements from the palette region are contained in sub-processes, wherein each of the subprocesses includes one or more of the process elements from the palette region;

if the user selected subset of process elements from the palette region are contained in the sub-processes, generating a number of domain regions within the workspace region equal to a number of different sub-processes that are associated with the sub-processes;

associating the submit process element and the approve process element with a human task process element group, wherein the submit process element and the approve process element represent tasks that users perform, and involve receiving and processing customer end user input;

associating a plurality of system task process elements with a system task process element group, wherein a first system task process element is associated with updating a human resource data base, a second system task process element is associated with updating an external system, a third system task process element is associated with a time limit, and a fourth system task process element is associated with sending an alert in response to an event;

associating an event process element group with event process elements representing events that occur during the process, wherein the events include a loan application being approved, and the loan application being declined;

associating a gateway process element group with gateway process elements associated with splitting process paths, merging process paths, and process flows;

providing a gateway process element that is event-based for a particular process path;

providing a function that connects the start process element with a human task process element using a first sequence flow process element, wherein a first arrow associated with the first sequence flow process element generates a first process path from the start process element to the human task process element, and connecting the human task process element with the end process element using a second sequence flow process element, wherein a second arrow associated with the second sequence flow process element generates a second process path from the human task process element to the end process element;

providing a function that associates each of the domain regions with a type of customer end user, wherein an owner domain region is associated with a loan application end user and a reviewer domain region is associated with a loan officer end user, wherein an owner that provides the loan application is a customer end user that fills in a form for a loan application, and submits the form for the loan application, wherein a reviewer is a loan officer that reviews the loan application, wherein the approve process element, a decline process element, the sequence flow process elements, and a fulfill loan process element are associated with the reviewer domain region, and a resubmit process element and the submit process element are associated with the owner domain region, building a customer end-user software system including a customer end-user interface and based on the process displayed in the workspace region of the developer-side user interface, wherein the process is displayed based on the user selected subset of process elements with the sub-processes, and the domain regions;

deploying the process;

initiating the start process element with a received message;

receiving customer end user input from a form submission for the form of the loan application at the human task process element;

ending the process at the end process element, wherein the end process element is associated with a notification;

receiving customer administrator and customer end user interactions with the process via the customer end-user interface and a customer administrator user interface after the deploying;

wherein the process is a first process that receives loan applications and enables review of the loan applications;

building a second process using the developer-side user interface, wherein the second process performs credit processing; and triggering the second process when a form is submitted for credit processing, wherein the second process uses a process element that performs calculations and a process element with operative roles that make changes in flow of the second process.

5. The method of claim 4, further comprising:
enabling the developer user to drag and drop the process elements from the palette region into the workspace region; and
enabling the developer user to connect particular process elements in the workspace region using sequence flow process elements.

6. The method of claim 4, further comprising enabling the developer user to expand one or more of the process element groups in order to show one or more of the process elements.

7. An apparatus comprising:
one or more processors; and
logic encoded in one or more non-transitory computer-readable storage media for execution by the one or more processors and when executed operable to perform operations comprising:
receiving, at a developer-side user interface used by a developer user of a developer client device, process element information, wherein the process element information defines process elements, wherein the process elements include a start process element, an end process element, sequence flow process elements, a submit process element, an approve process element, system task process elements, event process elements, and gateway process elements, wherein the start process element represents different types of start events including a document start event and a message start event, wherein the sequence flow process elements represent directional connections between two of the process elements, and wherein arrows indicate a direction of the directional connections;
displaying the process elements in a palette region in the developer-side user interface on the developer client device, wherein the process elements include at least two process elements that perform different system tasks but share at least one common functional characteristic;
determining that two or more process elements are integrated;
automatically adding new process elements to the palette region in response to the determining that two or more process elements are integrated;
receiving user selection of a subset of process elements from the palette region, wherein the developer user interacting with the developer-side user interface of the developer client device selected the subset of process elements, wherein the user selected subset of process elements includes a new process element from the new process elements added to the palette region, and wherein the user selected subset of process elements are associated with an updated dynamic business planning model;
displaying a process in a workspace region in the developer-side user interface based on the user selected subset of process elements from the palette region;
determining if the user selected subset of process elements from the palette region are contained in sub-processes, wherein each of the subprocesses includes one or more of the process elements from the palette region;
if the user selected subset of process elements from the palette region are if the user selected subset of process elements from the palette region are contained in the sub-processes, generating a number of domain regions within the workspace region equal to a number of different sub-processes that are associated with the sub-processes;

associating the submit process element and the approve process element with a human task process element group, wherein the submit process element and the approve process element represent tasks that users perform, and involve receiving and processing customer end user input;

associating a plurality of system task process elements with a system task process element group, wherein a first system task process element is associated with updating a human resource data base, a second system task process element is associated with updating an external system, a third system task process element is associated with a time limit, and a fourth system task process element is associated with sending an alert in response to an event;

associating an event process element group with event process elements representing events that occur during the process, wherein the events include a loan application being approved and the loan application being declined;

associating a gateway process element group with gateway process elements associated with splitting process paths, merging process paths, and process flows;

providing a gateway process element that is event-based for a particular process path;

providing a function that connects the start process element with a human task process element using a first sequence flow process element, wherein a first arrow associated with the first sequence flow process element generates a first process path from the start process element to the human task process element, and connecting the human task process element with the end process element using a second sequence flow process element, wherein a second arrow associated with the second sequence flow process element generates a second process path from the human task process element to the end process element;

providing a function that associates each of the domain regions with a type of customer end user, wherein an owner domain region is associated with a loan application end user and a reviewer domain region is associated with a loan officer end user, wherein an owner that provides the loan application is a customer end user that fills in a form for a loan application, and submits the form for the loan application, wherein a reviewer is a loan officer that reviews the loan application, wherein the approve process element, a decline process element, the sequence flow process elements, and a fulfill loan process element are associated with the reviewer domain region, and a resubmit process element and the submit process element are associated with the owner domain region, building a customer end-user software system including a customer end-user interface and based on the process displayed in the workspace region of the developer-side user interface, wherein the process is displayed based on the user selected subset of process elements with the sub-processes, and the domain regions;

deploying the process;

initiating the start process element with a received message;

receiving customer end user input from a form submission for the form of the loan application at the human task process element;

ending the process at the end process element, wherein the end process element is associated with a notification;

receiving customer administrator and customer end user interactions with the process via the customer end-user interface and a customer administrator user interface after the deploying;

wherein the process is a first process that receives loan applications and enables review of the loan applications;

building a second process using the developer-side user interface, wherein the second process performs credit processing; and triggering the second process when a form is submitted for credit processing, wherein the second process uses a process element that performs calculations and a process element with operative roles that make changes in flow of the second process.

8. The apparatus of claim 7, wherein the logic when executed is further operable to perform operations comprising enabling the developer user to drag and drop the process elements from the palette region into the workspace region.

9. The apparatus of claim 7, wherein the logic when executed is further operable to perform operations comprising enabling the developer user to connect particular process elements in the workspace region using sequence flow process elements.

10. The apparatus of claim 7, wherein the logic when executed is further operable to perform operations comprising enabling the developer user to expand one or more of the process element groups in order to show one or more of the process elements.

* * * * *

UNITED STATES PATENT AND TRADEMARK OFFICE
CERTIFICATE OF CORRECTION

PATENT NO. : 11,775,261 B2
APPLICATION NO. : 15/430244
DATED : October 3, 2023
INVENTOR(S) : Alabes et al.

Page 1 of 1

It is certified that error appears in the above-identified patent and that said Letters Patent is hereby corrected as shown below:

In the Specification

In Column 2, Line 2, delete "process ☐ elements" and insert -- process elements --, therefor.

In Column 6, Line 28, delete "System(s)" and insert -- System(s)) --, therefor.

In Column 6, Line 29, delete "System(s)" and insert -- System(s)) --, therefor.

In Column 7, Line 38, delete "Opts," and insert -- Opts"), --, therefor.

In Column 7, Line 52, delete ""System(s)"" and insert -- "System(s)") --, therefor.

In Column 15, Line 45, after "." delete "☐", therefor.

In Column 16, Line 41-42, delete "process ☐ elements" and insert -- process elements --, therefor.

In Column 20, Line 17, after "." delete "☐", therefor.

In the Claims

In Column 26, Line 29, in Claim 1, delete "subprocesses" and insert -- sub-processes --, therefor.

In Column 28, Line 49, in Claim 4, delete "subprocesses" and insert -- sub-processes --, therefor.

In Column 29, Line 4, in Claim 4, delete "approved," and insert -- approved --, therefor.

In Column 29, Line 29, in Claim 4, delete "subprocesses" and insert -- sub-processes --, therefor.

Signed and Sealed this
Twenty-fifth Day of June, 2024

Katherine Kelly Vidal
*Director of the United States Patent and Trademark Office*